Oct. 17, 1939.   H. C. HOWARD   2,176,343
PROCESS FOR THE SEPARATION AND PURIFICATION OF ORGANIC ACIDS
Filed April 5, 1937
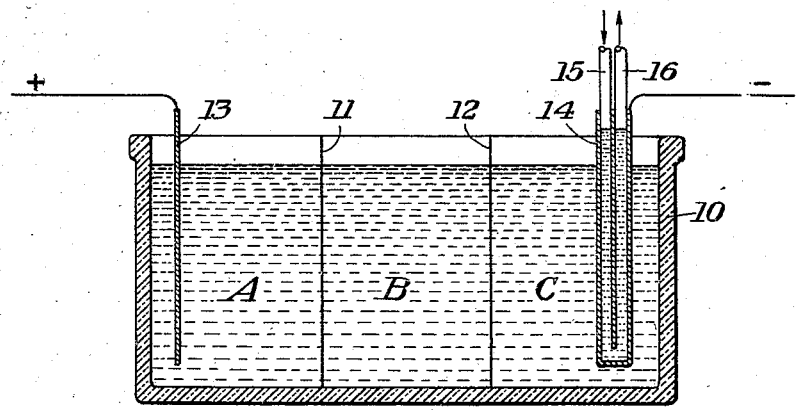
INVENTOR
Henry C. Howard
By Stebbins, Blenko & Parmelee
His Attorneys Patented Oct. 17, 1939

2,176,343

UNITED STATES PATENT OFFICE 2,176,343

PROCESS FOR THE SEPARATION AND PURIFICATION OF ORGANIC ACIDS

Henry C. Howard, Pittsburgh, Pa., assignor to Carnegie Institute of Technology, Pittsburgh, Pa., a corporation of Pennsylvania Application April 5, 1937, Serial No. 135,036

3 Claims. (Cl. 204—9)

This invention relates to a process for the separation and purification of organic acids. It can be applied to those water-soluble organic acids which form salts which are soluble in water and those organic acids which form salts which are relatively insoluble in water. It is particularly useful for the separation and purification of organic acids obtained by the oxidation of coal, coke and other carbonaceous materials.

The recovery of water-soluble organic acids in the fine state from their salts in good yields presents great difficulties. The usual procedure consists in double decomposition of a barium salt of the acid with sulphuric acid or a lead salt of the acid with hydrogen sulphide, removal of the precipitated barium sulphate or lead sulphide by filtration, and recovery of the acid by evaporation of the filtrate. In such a procedure, the organic acid recovered is always contaminated with inorganic salts and must be purified by other means. Furthermore, there is the undesired byproduct of barium sulphate or lead sulphide.

I have found that if a solution of the salts of the water-soluble organic acids obtained, for example, by the oxidation of coil, coke or other carbonaceous materials, is placed in the central compartment of a three-compartment diaphragm cell, the diaphragms being composed of parchment or Cellophane for example, and electrolyzed with an insoluble anode, as for example, a platinum gauze, and a suitable cathode, as for example, a copper sheet or a copper tube through which water can be circulated for cooling; the organic acid can be recovered in a pure form in good yield by evaporation of the anode liquors and that the hydroxide of the metal of the original salt can be similarly recovered by evaporation of the cathode liquors.

In the drawing, there is conventionally illustrated a three-compartment diaphragm cell suitable for carrying out my invention. The apparatus consists of a vessel 10 formed from non-conducting material such as porcelain. The vessel is divided into three fluid-tight compartments, including end compartments A and C and a middle compartment B, by two partitions 11 and 12 of porous membrane such as parchment or Cellophane. In the end compartment A, herein called the "anodic" compartment, a suitable anode 13 formed from insoluble material, for example, platinum gauze, is located. In the end compartment C, herein called the "cathodic" compartment, a suitable cathode 14 formed, for example, from copper, is placed. The cathode is preferably hollow and has connected to the hollow portion two pipes 15 and 16 by means of which a stream of cooling water can be circulated through the cathode. In many instances, it will be sufficient if the cathode is made from an ordinary copper plate. The anode and the cathode have suitable connections to a source of direct current electricity. Under some circumstances, it may be desirable to cool the liquid in the anodic compartment while the process is being carried out. Such cooling can be accomplished by placing a suitable cooling coil in the anodic compartment and causing a cooling fluid to be circulated therethrough. The coil should be made from a material such as glass which would not be attacked by or affect the anodic liquid.

In practicing my invention, the organic acid salt in water solution is placed in the middle compartment B and the anodic compartment A and the cathodic compartment C are filled with distilled water. The anode 13 and the cathode 14 are connected to a suitable source of direct current, not shown. The organic acid will pass into the anodic compartment A through membrane 11 and the metallic hydroxide will pass into the cathodic compartment C through the membrane 12. From time to time, depending upon conditions, it is advisable to draw off the liquors wholly or partly from the end compartments and to refill the compartments with distilled water. The liquors collected from the anodic compartment are then evaporated to obtain the organic acid; likewise, the liquors obtained from the cathodic compartment are evaporated to obtain the metallic hydroxide.

The method has been applied to the recovery of acids formed by the oxidation of coal. The chief oxidation products of bituminous coal are carbonic, oxalic, acetic, and aromatic acids, the distribution of the carbon of the original coal in these acids being, respectively, approximately as follows: 48.5%, 15.9%, 2.3% and 33.3%. By electrolysis of a solution of, for example, the potassium salts of these acids, such as is obtained in an alkaline permanganate oxidation of coal, it has been found possible to recover 86% of the oxalic acid and 96% of the aromatic acids substantially free from inorganic impurities. Pure potassium hydroxide can be recovered by evaporation of the cathode liquors.

The method can also be applied to the recovery of the free acid from a relatively insoluble salt. For example, mellitic acid from ammonium mellitate. In this case, the ammonium mellitate is suspended in the central compartment and the continuous migration into and withdrawal from the end compartments of mellitic acid and ammonium hydroxide results in quantitative decomposition of the salt and recovery of pure mellitic acid in solution in the anodic compartment, and of ammonium hydroxide in solution in the cathodic compartment. The acid can be recovered from the anodic solution by evaporation.

My invention discloses a simple, satisfactory and economical process for the recovery of water-soluble organic acids from their salts.

I claim:

1. A process for the separation and purification of the aromatic organic acids formed by the oxidation of coal, coke and carbonaceous substances which contain at least one six-membered carbon ring with other carbon atoms attached thereto, which consists in placing a solution of the alkaline metal salt of the acid in the middle compartment of a three-compartment diaphragm cell, placing distilled water in the end compartments and passing a current of electricity through the cell whereby the acid radical and the metal radical are caused to move in opposite directions to the end cells, and collecting the metal radical and the acid radical in the separate end compartments.

2. A process for the separation and purification of the aromatic organic acids formed by the oxidation of coal, coke and carbonaceous substances which contain at least one six-membered carbon ring with other carbon atoms attached thereto, by means of a three-compartment diaphragm cell having a middle compartment and an anodic compartment having an insoluble anode therein and a cathodic compartment, which consists in placing a solution of an alkaline metal salt of an acid in the middle compartment, placing distilled water in the anodic and cathodic compartments and passing direct current electricity through the cell, whereby the organic acid is caused to enter the anodic compartment and the metal of the salt is caused to enter the cathodic compartment on the opposite side of the middle compartment.

3. A process for the separation and purification of the aromatic organic acids formed by the oxidation of coal, coke and carbonaceous substances which contain at least one six-membered carbon ring with other carbon atoms attached thereto, by means of a three-compartment diaphragm cell having a middle compartment and an anodic compartment having a platinum anode therein and a cathodic compartment having a water-cooled copper cathode therein, which consists in placing a solution of an alkaline metal salt of the acid in the middle compartment, placing distilled water in the anodic and the cathodic compartments and passing direct current electricity through the cell, whereby the organic acid is caused to enter the anodic compartment and the metal of the salt is caused to enter the cathodic compartment on the opposite side of the middle compartment.

HENRY C. HOWARD.